United States Patent

Crabtree

[11] 3,951,974
[45] Apr. 20, 1976

[54] TRIAZINE DYESTUFFS
[75] Inventor: Allen Crabtree, Manchester, England
[73] Assignee: Imperial Chemical Industries Limited, London, England
[22] Filed: May 21, 1974
[21] Appl. No.: 472,060

Related U.S. Application Data
[63] Continuation-in-part of Ser. No. 323,359, Jan. 15, 1973, abandoned.

[30] Foreign Application Priority Data
Aug. 28, 1973 United Kingdom............... 40522/73
Mar. 20, 1974 United Kingdom............... 12294/74

[52] U.S. Cl.......................... 260/249.5; 260/249.8;
8/1 E; 8/54.2; 260/267; 260/250 A; 260/250
Q; 260/250 P; 260/251 Q; 260/256.5 R;
260/256.4 R; 260/256.4 N
[51] Int. Cl.² ............... C07D 251/44; C07D 251/50
[58] Field of Search...................... 260/249.5, 249.8

[56] References Cited
FOREIGN PATENTS OR APPLICATIONS
507,417   12/1951   Belgium
1,644,330   4/1971   Germany
944,885   12/1963   United Kingdom Primary Examiner—John M. Ford
Attorney, Agent, or Firm—Cushman, Darby & Cushman

[57] ABSTRACT
Reactive azine dyestuffs of the formula:

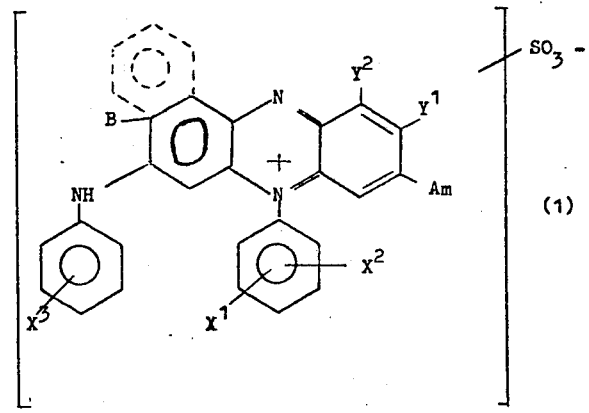

wherein Am is selected from a group consisting of anilino, di(lower alkyl)amino and N(lower alkyl)benzylamino radicals, one of $Y^1$ and $Y^2$ is H or $SO_3H$ and the other is H or an alkyl or alkoxy group of 1–4 carbon atoms, one of $X^1$ or $X^2$ is H, $SO_3H$, $-SO_2CH_2CH_2OSO_3H$ or $-SO_2CH=CH_2$ and the other is H, an alkyl or alkoxy group of 1–4 carbon atoms, Cl or $CO_2H$, $X^3$ is H, an alkyl group of 1–4 carbon atoms or $SO_3H$, when the dotted fused ring is present B is absent and when the dotted fused ring is absent B is H or an alkyl or alkoxy group of 1–4 carbon atoms, at least one of the pendant benzene nuclei contains a NHQ group where Q is a cellulose-reactive group except when $X^1$ or $X^2$ is $-SO_2CH_2CH_2OSO_3H$ or $-SO_2CH=CH_2$ and the dyestuff as a whole contains at least 2 sulphonic acid groups.

The products are reactive dyes for cellulose which are colored in strong bright blue or reddish-blue shades of excellent fastness to washing and of a reasonable fastness to light, especially in respect of wet fading.

6 Claims, No Drawings

TRIAZINE DYESTUFFS

This application is a continuation in part of my Application Ser. No. 323359, filed 15th Jan. 1973, now abandoned.

This invention relates to new water-soluble reactive dyestuffs and more particularly to water-soluble reactive dyestuffs of the azine series.

According to the invention there are provided reactive 5 azine dyestuffs of the formula:

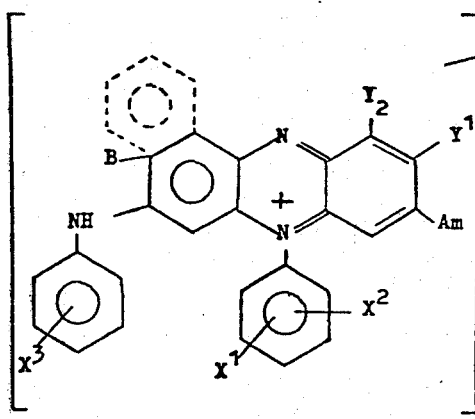

(1)

wherein Am represents an anilino, di(lower alkyl)amino or N(lower alkyl)benzylamino group.

One of $Y^1$ and $Y^2$ is H or $SO_3H$ and the other is H or an alkyl or alkoxy group of 1–4 carbon atoms.

One of $X^1$ or $X^2$ is H, $SO_3H$, $-SO_2CH_2CH_2OSO_3H$ or $-SO_2CH=CH_2$ and the other is H, an alkyl or alkoxy group of 1–4 carbon atoms, Cl or $CO_2H$.

$X^3$ is H, an alkyl group of 1–4 carbon atoms or $SO_3H$, when the dotted fused ring is present B is absent and when the dotted fused ring is absent B is H or an alkyl or alkoxy group of 1–4 carbon atoms, at least one of the pendant benzene nuclei contains a NHQ group where Q is a cellulose-reactive group except when $X^1$ or $X^2$ is $-SO_2CH_2CH_2OSO_3H$ or $-SO_2CH=CH_2$ and the dyestuff as a whole contains at least 2 sulphonic acid groups.

The sulphonic acid groups mentioned above may be provided by the groups $X^1$, $X^2$, $X_3$, $Y^1$ or $Y^2$ or alternatively or in addition by other sulphonic acid groups which may be present in the aromatic nuclei of the dyestuff.

By "cellulose-reactive group" is meant a group containing an unsaturated linkage or a substituent capable of reacting with the hydroxyl groups of the cellulose molecule in the presence of an alkaline substance and attaching the dyestuff molecule by a covalent linkage.

As examples of cellulose-reactive groups, there may be mentioned vinyl sulphone and aliphatic sulphone groups which contain a halogen atom or sulphate ester group in β-position to the sulphur atom, e.g. α β-chloroethyl- or β-sulphatoethylsulphone and β-sulphatoethylsulphonylamino groups, α,β-unsaturated acyl radicals of aliphatic carboxylic acids for example, acrylic acid, α-chloro acrylic acid, propiolic acid, maleic acid and mono- and di-chloro- maleic acids; also the acyl radicals of acids which contain a substituent which reacts with cellulose in the presence of an alkali, e.g. the radical of a halogenated aliphatic acid such as chloroacetic acid, β-chloro- and β-bromopropionic acids and α,β-dichloro- and dibromo-propionic acids. Other examples of cellulose reactive groups are tetrafluorocyclobutyl carbonyl, trifluoro-cyclo butenyl carbonyl, tetrafluorocyclobutylethenyl carbonyl, trifluorocyclobutenylethenyl carbonyl, and heterocyclic radicals which contain 2 or 3 nitrogen atoms in the heterocyclic ring and at least one cellulose-reactive substituent on a carbon atom of the ring.

As examples of such heterocyclic radicals, there may be mentioned, for example:

3:6-dichloropyridazine-4-carbonyl
2:3-dichloro-quinoxaline-5- or -6-sulphonyl,
2:3-dichloro-quinoxaline-5- or -6-carbonyl,
2:4-dichloro-quinazoline-6- or -7-sulphonyl,
2:4:6-trichloro-quinazoline-7- or -8-sulphonyl,
2:4:7- or 2:4:8-trichloro-quinazoline-6-sulphonyl,
2:4-dichloro-quinazoline-6-carbonyl,
1:4-dichloro-phthalazine-6-carbonyl,
B-(4:5-dichloropyridazanyl-1-)-propronyl, invention can benzimidazolooxacarbocyanine
2:4-dichloro-pyrimidine-5-carbonyl,
4-(4':5'-dichloro-pyridaz-6'-on-1'-yl)benzoyl,
4-(4':5'-dichloro-pyridaz-6'-on-1'-yl)phenylsulphonyl,
5-chloro-2-methylsulphonyl-6-methyl-pyrid-4-yl,
2,4-difluoro-5-chloropyrimid-6-yl, photographic and more particularly s-triazin-2-yl and pyrimidin-2-yl or -4-yl radicals which contain on at least one of the remaining 2,4- and 6-positions, a bromine or, preferably, a chlorine atom, a sulphonic acid group, a thiocyanato group, an aryloxy or arylthio group containing an electronegative substituent such as sulphophenoxy, sulphophenylthio, nitrosulphophenoxy, disulphophenoxy and sulphonaphthoxy, or a group of the formula:

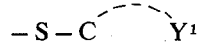

(2)

wherein $Y^1$ represents a group of atoms necessary to form a 5— or 6-membered heterocyclic ring which may carry substituents or form part of a fused ring system; or a quaternary ammonium or pyridinium group; or a group of the formula:

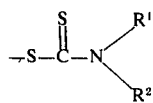

(3)

wherein R¹ and R² each represents the same or different alkyl, cycloalkyl, aryl or aralkyl group, or R¹ and R² together form, together with the nitrogen atom, a 5— or 6-membered heterocyclic ring; or a group of the formula:

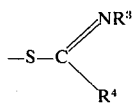

(4)

wherein R³ and R⁴ may be the same or different and each represents a hydrogen atom or an alkyl, aryl or aralkyl group.

In the cases where the pyrimidine ring or triazine ring carries only one such reactive substituent, the said ring may have a non-reactive substituent on the remaining carbon atoms.

By a non-reactive substituent there is meant a group which is bound by a covalent bond to a carbon atom of the triazine or pyrimidine nucleus, which covalent bond is not ruptured under the conditions used for application of the reactive dye.

As examples of such substituents, there may be mentioned, for example, primary amino and hydroxyl groups, also mono- or disubstituted amino groups, etherified hydroxyl and etherified mercapto groups; in the case of substituted amino groups, this class includes, for example, mono- and di-alkylamino groups in which the alkyl groups preferably contain at most 4 carbon atoms, and which may also contain substituents for example, hydroxyl or alkoxy groups, and phenylamino, preferably sulphonated phenylamino which may be further substituted on the nucleus, e.g. by $CH_3$, $OCH_3$, $CO_2H$ or Cl, or on the N atom, e.g. by $CH_3$, $C_2H_5$, hydroxyethyl or sulphomethyl, and naphthylamino groups preferably sulphonated naphthylamino containing up to 3 sulphonic acid substituents; in the case of etherified hydroxyl and mercapto groups, this class includes, for example, alkoxy and alkylthio groups preferably those of low molecular weight, i.e. having up to 4 carbon atoms and phenoxy, phenylthio, naphthoxy or naphthylthio groups; as particular examples of all these classes there may be mentioned, for example, methylamino, ethylamino, dimethylamino, β-hydroxyethylamino, di-(β-hydroxyethyl)amino, β-chloroethylamino, cyclohexylamino, anilino, o-, m- and p-sulphoanilino, 2,4-, 2,5- and 3,5-disulphoanilino, N-methylsulphoanilino, N-β-hydroxyethylsulphoanilino, mono-, di- and tri-sulphonaphthylamino, 4- and 5-sulpho-o-tolylamino, o-, m- and p-carboxyanilino, 4- and 5-sulpho-2-carboxyanilino, N-ω-sulphomethylanilino, methoxy, ethoxy, and butoxy, phenoxy, p-sulphophenoxy, o-chlorophenoxy and phenylthio groups. Chlorine atoms or cyano, nitro, carboxy and carbalkoxy groups in the 5-position of a pyrimidyl radical come into the category of non-reactive substituents.

If desired, the cellulose-reactive group may take the form:

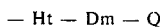

(5)

where Ht is a s-triazine nucleus which contains a cellulose-reactive Cl or Br atom, Dm represents a diamine residue linking Ht and Q by the 2 amino groups and Q has the meaning stated above.

When symbol Q represents a s-triazine ring containing a Cl atom and a non-reactive substituent, the latter can be the residue of a colored amine, e.g. of the azo, anthraquinone or phthalocyanine series, but more especially a residue of formula (1) so that the dyestuff as a whole contains 2 groups of formula (1) linked by a chloro-s-triazine radical or 2 groups of formula (1) linked through two chloro-s-triazine groups and a diamine radical.

The invention also provides a process for manufacture of the new dyestuffs other than those in which $X_1$ or $X_2$ is $-SO_2CH_2CH_2OSO_3H$ or $-SO_2 CH=CH_2$ which comprises reacting a phenazine compound of formula (1) wherein Am, B, $Y^1$, $Y^2$ and $X^3$ have the meaning stated above one of $X^1$ and $X^2$ is H or $SO_3H$ and the other is H, alkyl or alkoxy of 1–4 carbon atoms, Cl or $CO_2H$ and at least one of the pendant benzene nuclei contains a $NH_2$ group with carbyl sulphate, the acid chloride of a carboxylic or sulphonic acid which contains a cellulose-reactive group or a heterocyclic compound which contains a halogen atom and at least one cellulose-reactive substituent attached to carbon atoms of the ring, together containing at least 2 sulphonic acid groups.

The above process can conveniently be carried out by stirring the reactants in an aqueous medium, optionally in the presence of a water-soluble organic solvent, at a temperature within the range 0°–100°C, and preferably maintained at a pH of from 5–8.

As examples of acid chlorides or heterocyclic compounds which may be used, there may be mentioned for example acid halides of B-unsaturated aliphatic acids such as chloromaleic anhydride, propiolyl chloride and acryloyl chloride, the acid chlorides of halogenated aliphatic acids such as chloroacetyl chloride, sulphochloroacetyl chloride, B-bromo- and B-chloropropionyl chloride and :B-dichloro- and dibromo-propionyl chlorides, 2,2,3,3-tetrafluorocyclobutyl carbonyl chloride, B-(2,2,3,3-tetrafluorocyclobutyl) acryloyl chloride, 2,3,3-trifluorocyclobut-1-enyl carbonyl chloride, B-(2,3,3-trifluorocyclobut-1-enyl)acryloyl chloride, and heterocyclic compounds which contain at least 2 nitrogen atoms in the heterocyclic rings and which contain 2 or more halogen, especially chlorine atoms in the ortho positions to the nitrogen atoms, such as 2:3-dichloro-quinoxaline-5- and -6-carbonyl chlorides,
2:3-dichloroquinoxaline-5- and -6-sulphonyl chlorides,
2:4-dichloro-quinazoline-6- and -7-sulphonyl chlorides,
2:4:6-trichloro-quinazoline-7- and -8-sulphonyl chlorides,
2:4:7- and 2:4:8-trichloro-quinazoline-6-sulphonyl chlorides,
2:4-dichloro-quinazoline-6-carbonyl chloride,
1:4-dichloro-phthalazin-6-carbonyl chloride,
2:4-dichloro-pyrimidine-5-carbonyl chloride, 5' β-(4:5-dichloro-pyridazonyl-1-)-propionyl chloride,
1-(4'-chlorocarbonylphenyl)-4:5-dichloro-6-pyridazone,
1-4'-chlorosulphonylphenyl-4:5-dichloro-6-pyridazone 2:4:6-tribromo- and trichloro-pyrimidines,
2:4:5:6-tetrachloropyrimidine,
5-methyl-2:4:6-trichloropyrimidine,
5-nitro-2:4:6-trichloropyrimidine,
2:4-dichloro-5-nitro-6-methyl-pyrimidine,
2:4-dichloro-5-nitropyrimidine,
2:4:6-trichloro-5-cyanopyrimidine,
5-ethoxycarbonyl-2:4-dichloro-pyrimidine,
2:4-dichloropyrimidine-5-carbonyl chloride,
4,5-dichloro-2-methylsulphonyl-6-methylpyrimidine,
2,4,6-trifluoro-5-chloropyrimidine,
3:6-dichloropyridazine-4-carbonyl chloride
cyanuric bromide,
cyanuric chloride;

the primary condensation products of cyanuric bromide or cyanuric chloride with ammonia, an alkali metal sulphite or thiocyanate or an organic mercaptan, hydroxy compound or an organic primary or secondary amine, for example:

methanol,
ethanol,
iso-propanol,
phenol,
o-, m- and p-chlorophenols,
o-, m- and p-cresols,
o-, m- and p-sulphophenols,
thiophenol,
thioglycollic acid,
dimethyldithiocarbamic acid,
mercaptobenzthiazole,
thioacetamide,
methyl-,
dimethyl-,
ethyl-,
diethyl-,
n-propyl-,
iso-propyl-,
butyl-,
hexyl- and cyclohexylamines,
toluidines,
piperidine,
morpholine,
methoxyethylamine,
ethanolamine,
diethanolamine,
aminoacetic acid,
aniline-2,4-, 2,5- and 3,5-disulphonic acids,
orthanilic, metanilic and sulphanilic acids,
2-, 3- and 4-aminobenzoic acids,
4- and 5-sulpho-2-aminobenzoic acids,
4- and 5-sulpho-o-toluidines,
5-amino-2-hydroxybenzoic acid,
2-amino-ethanesulphonic acid,
amino-naphthalene mono-, di- and tri-sulphonic acids
and amino- and N-methylamino-ethanesulphonic acid;

also the secondary condensation products of cyanuric chloride with alkali metal sulphites, alkali metal thiocyanates, phenols and thiophenols containing an electronegative substituent, and compounds of the formulae:

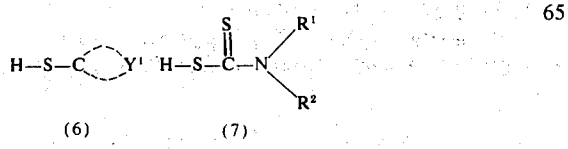

(6)  (7)

and

(8)

wherein $Y^1$, $R^1$, $R^2$, $R^3$ and $R^4$ have the meanings stated above.

The phenazine compounds of formula (1) used in the above process are in some cases known and in others new. They are of various types which can be obtained by appropriate methods.

a. Compounds may contain the fused ring shown dotted in formula (1) as in formula (9) and wherein the group Am bears an amino group.

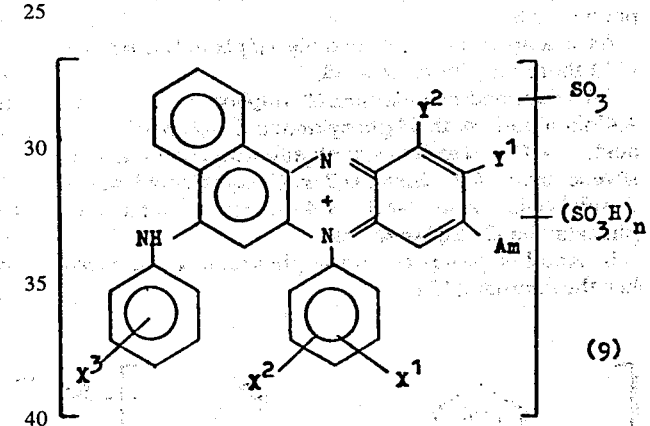

(9)

Such compounds may be prepared by reacting optionally sulphonated 1,3-dianilinonaphthalene compounds of the formula (10)

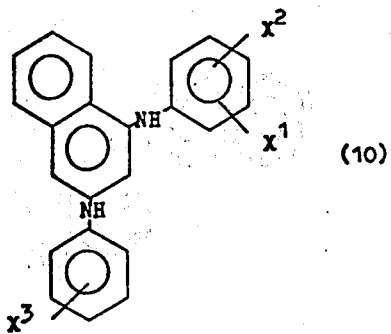

(10)

with, optionally sulphonated, amines of formula (11), where the group Am bears an NH₂ group e.g. in 4,4'-diaminodiphenxylamines

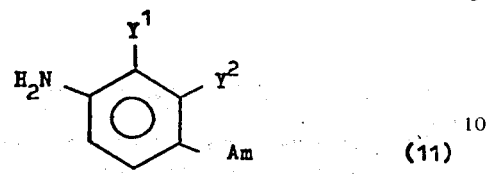

Where Am, Y¹, Y² and X³ have the meaning stated above and one of X¹ or X² is H or SO₃H and the other is H alkyl or alkoxy of 1-4 carbon atoms, Cl or CO₂H and n has a value of at least 1.

As examples of the optionally sulphonated amines (10) there may be mentioned.

1,3-dianilinonaphthalene-8-sulphonic acid, 1,3-dianilinonaphthalen 6,8-disulphonic acid, 1,3-di(4'-methylphenylamino)naphthalene-8-sulphonic acid 1,3-di(4'-methoxyphenylamino)naphthalene8-sulphonic acid and 1,3-di(4'-ethylphenylamino)napthalene-8-sulphonic acid.

As examples of the optionally sulphonated amines (11) there may be mentioned.

4,4'-diaminodiphenylamine-2'-sulphonic acid, 4,4'diamino-2-methyldiphenylamine-2'-sulphonic acid, 4,4' diamino-3-methyldiphenylamine-2'-sulphonic acid, 4,4' diamino-2-methoxydiphenylamine-2'-sulphonic acid and 4,4'diamino-3-methoxydiphenylamine-2-sulphonic acid b. Another group of amino phenazine compounds has the formula (12)

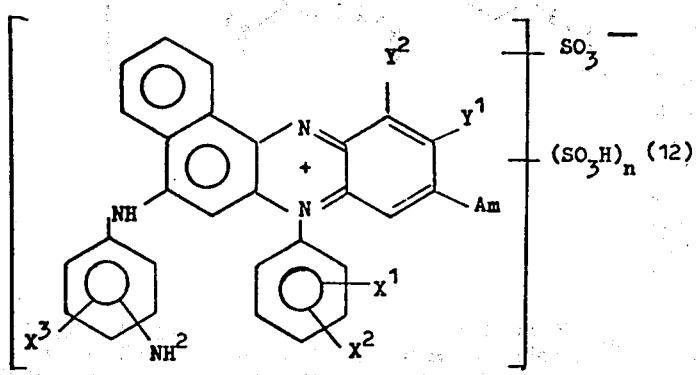

Such compounds may be prepared by reacting optionally sulphonated β-phenyl naphthylamines of formula (13)

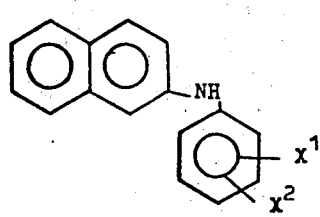

with a p-nitroso or p-aminobenzene compound of formula (14)

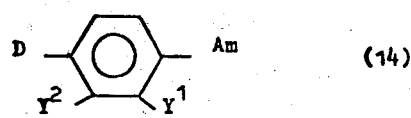

Where D is —NO or —NH₂ the resulting intermediate product is treated with an alkali metal bisulphite to introduce a sulphonic acid group and finally reacted with a phenylene diamine of formula (15).

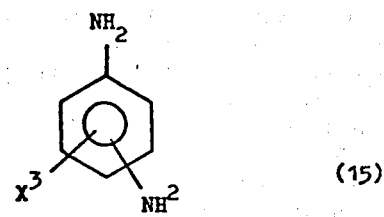

the symbols Am, Y¹, Y² and X³ have the meaning stated above and one of X¹ or X² is H or SO₃H and the other is H, alkyl or alkoxy of 1-4 carbon atoms, Cl or CO₂H and n has a value of at least one.

As examples of the β-phenylnaphthylamines of formula (13) there may be mentioned:

phenyl-β-naphthylamine, 3'-methylphenyl-β-naphthylamine 4'-sulphophenyl-β-naphthylamine,3'-methoxyphenel-β-naphthylamine 4',methylphenyl-β-naphthylamine and 3' sulphophenyl-β-naphthylamine.

As examples of the compounds of formula (14) there may be mentioned;

4-amino-N,N,-dimethyl aniline, 4-amino-N,N-diethyl aniline 4-amino-N-ethyl-N-(3'-sulphobenzyl)aniline,4-amino-N-methyl,-N-(3'-sulphobenzyl)aniline, 4-amino-N,N(β-hydroxyethyl)aniline, 4-nitroso-N,N,-dimethyl aniline, 4-nitroso-N,N-diethylaniline 4-nitroso-N-ethyl-N-(3'-sulphobenzyl)aniline, 4 nitroso-N-methyl-N-(3'-sulphobenzyl)aniline and 4-nitroso-N,N(βhydroxyethyl)aniline.

As examples of the phenylene diamines of formula (15) there may be mentioned;

1,4-diaminobenzene-2,5-disulphonic acid, 1,4-diaminobenzene-2-sulphonic acid, 2,5-diaminotoluene and 2,5-diaminoanisidine.

(c) A further group of amino phenazine compounds has the formula (16)

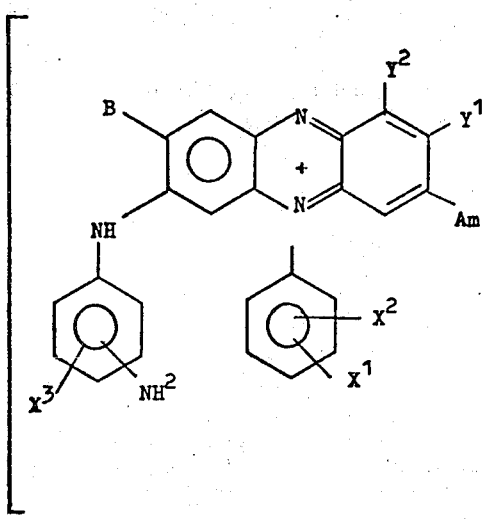 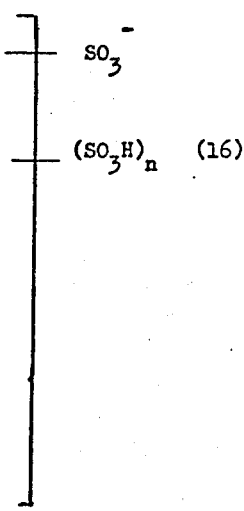

and may be prepared by condensing optionally sulphonated, nitro amino diphenylamine compounds of the formula (17)

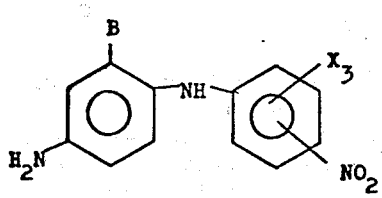

with an optionally sulphonated amine of the formula (18)

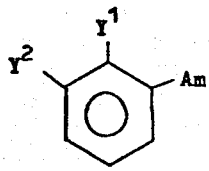

and an optionally sulphonated, amine of formula (19)

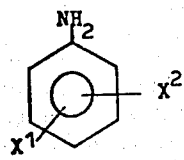

in the presence of an oxidizing agent and reducing the product, the symbols Am, B, $Y^1$, $Y^2$ and $X^3$ have the meanings stated above, one of $X^1$ or $X^2$ is H or $SO_3H$ and the other is H, alkyl or alkoxy of 1–4 carbon atoms, Cl or $CO_2H$ and n has a value of at least one.

As examples of compounds of formula (17) which may be used there may be mentioned:

4-nitro-4'-aminodiphenylamine-2-sulphonic acid,
4-nitro-4'-amino-3'-methyldiphenylamine-2-sulphonic acid,
4-nitro-4'-amino-3'-ethyldiphenylamine-2-sulphonic acid, and
4-nitro-4'-amino-3'-methoxydiphenylamine-2-sulphonic acid.

As examples of formula (18) which may be used, there may be mentioned:
N-ethyl-N-(3'-sulphobenzyl)aniline,
N-n-propyl-N-(3'-sulphobenzyl)aniline,
dimethyl- and diethyl-anilines,
di-(B-hydroxyethyl)aniline,
di-(B-cyanoethyl)aniline,
N-methyl- and N-ethyl-N-benzylanilines and dibenzylaniline.

As examples of compounds of formula (19) which may be used, there may be mentioned:
4-chloroaniline-3-sulphonic acid,
4-methylaniline-3-sulphonic acid,
4-methoxyaniline-3-sulphonic acid,
3-methylaniline-4-sulphonic acid,
3-methoxyaniline-4-sulphonic acid,
4-chloroaniline-3-sulphonic acid.

The cellulose-reactive dyes of formula (1) wherein the cellulose-reactive group is a s-triazine nucleus substituted by a chlorine or bromine atom and an amino or substituted amino group can also be obtained by reacting the amino phenazine compound with cyanuric chloride or bromide to form a cellulose-reactive dye of formula (1) containing a dichloro- or dibromo-s-triazine group and reacting with ammonia or an amine.

This process can conveniently be carried out by stirring the reactants in an aqueous medium, optionally in the presence of a water-soluble organic solvent, at a temperature of from 30°–60°C, and preferably maintaining the pH at from 5–8 by adding an acid-binding agent to neutralize the hydrogen halide formed during the reaction. Suitable acid-binding agents are alkali metal hydroxides, carbonates and bicarbonates, or an excess of ammonia or aliphatic amine where this is one of the reactants.

As amines, there can be used, for example, any of those enumerated in the above paragraph.

Also, by use of a diamine in the proportion of 1 mole of diamine to 2 moles of the dichloro-s-triazine dye, the product obtained is of the kind mentioned above where the dyestuff as a whole contains 2 groups of formula (1) linked through two chloro-s-triazine groups and a diamine radical. In this connection, there may be used, e.g. any of the following:

piperazine,
aliphatic diamines e.g. alkylene diamines and other α,ω-diamino aliphatic compounds, e.g. ethylene diamine,
1,2- and 1,3-propylenediamines,
1,6-hexylene diamine,
triethylene tetramine,
di-(β-aminoethyl)ether,
aromatic diamines of the benzene and naphthalene series, more especially those containing 1 or 2 SO₃H groups, e.g.:
m- and p-phenylenediamines,
1,3-phenylenediamine-4-sulphonic and 4,6-disulphonic acids,
1,4-phenylenediamine-2-sulphonic and 2,5-disulphonic acids,
2,6-naphthylene diamine-4-sulphonic and 4,8-disulphonic acids,
1,5-naphthylene diamine-2- and -4-sulphonic and 3,7-disulphonic acids,
4,4'-diaminodiphenyl-2-sulphonic and 2,2'-disulphonic acids,
4,4'-diaminostilbene-2,2'-disulphonic acid,
4,4'-diaminodiphenylurea-2,2'- and 3,3'-disulphonic acids,
4,4'-diaminodiphenylamine-2,2'-disulphonic acid,
4,4'-diaminodiphenoxyethane-2,2'-disulphonic acid,
4,4'-diaminodiphenylmethane-2,2'-disulphonic acid,
4,4'-diaminoazobenzene-2-sulphonic and 2,2'-disulphonic acids,
N-methyl and N-ethyl-1,4-phenylenediamine-2-sulphonic acids and
N-(β-hydroxyethyl)ethylenediamine.

Alternatively by reacting with a diamine in equimolar proportion, the resulting product contains a free amino group and can be reacted with carbyl sulphate or the acid chloride of a carboxylic or sulphonic acid which contains a cellulose-reactive group or a heterocyclic compound which contains a halogen atom and at least one cellulose-reactive substituent attached to carbon atoms of the ring, whereby the dyestuff obtained contains a cellulose-reactive group of formula (5) in which Ht represents the 2-chloro-4,6-s-triazinylene radical.

The cellulose-reactive dyes of formula (1) wherein the cellulose-reactive group is a s-triazine nucleus substituted by SO₃H, a quaternary ammonium group or a group of formulae (2), (3) and (4), can be obtained in a similar manner by forming a cellulose-reactive dye of formula (1) containing a s-triazine group substituted by at least one chlorine or bromine atom by any of the above methods and reacting this with an alkali metal salt of sulphurous acid, a tertiary amine or a compound of formulae (6), (7) and (8).

The invention also provides a process for the manufacture of the new dyestuffs of formula (1) other than those having an NHQ group present i.e. those in which one of the groups X¹ or X² is —SO₂CH₂CH₂OSO₃H or —SO₂CH=CH₂, which comprises condensing, optionally sulphonated, aminodiphenylamines of formula (29)

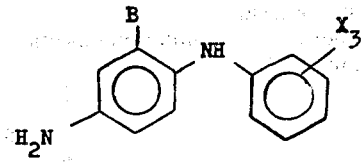

with amines of formula (18) and optionally sulphonated amines of the formula (20)

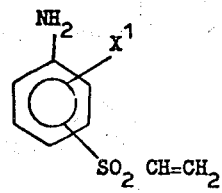

alternatively the amine (20) may be replaced by amine (21), in which case the product is treated with sulphuric acid to sulphate the alcoholic hydroxyl group.

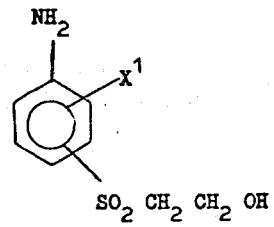

the symbol X¹ representing H, alkyl or alkoxy of 1–4 carbon atoms, Cl or CO₂H.

As examples of compounds of the formula (29) which may be used there may be mentioned:
4'-aminodiphenylamine-2-sulphonic acid
4'-amino-3'-methyldiphenylamine-2-sulphonic acid
4'-amino-3'-ethyldiphenylamine-2-sulphonic acid, and
4'-amino-3'-methoxydiphenylamine-2-sulphonic acid.

As examples of the compounds of formula (20) there may be mentioned:
3- or 4-aminovinylsulphonylbenzene,
2-methyl-4-vinylsulphonylaniline,
2-methoxy-4-vinylsulphonylaniline, or
2-methyl-5-vinylsulphonylaniline.

As examples of compounds of formula (21) there may be mentioned:
3- or 4-β-hydroxyethylsulphonylaniline,
2- or 3-methyl-4-β-hydroxyethylsulphonylaniline, or
2-methoxy-5-β-hydroxyethylsulphonylaniline.

The new dyestuffs can be used for coloring a variety of materials, e.g. natural and synthetic polyamide materials, e.g. wool and nylon, but more particularly natural or artificial cellulose materials, e.g. cotton, linen and viscose rayon, which they dye or print in the presence of alkali to give bright blue and reddish-blue shades of excellent fastness to washing.

Blue reactive dyes commercially available are generally based either on the anthraquinone chromophore or on a coppered azo chromophore. The present dyes exhibit an advantage over the former in providing a much higher color strength on a molar basis, and against the latter in having much better fastness to wet fading.

The invention is illustrated by the following Examples in which parts are by weight and the ratio w/v is grams/liter.

EXAMPLE 1

A mixture of 15.6 parts of 1,3-diphenylaminonapthalene-8-sulphonic acid, 11.4 parts of 4,4'-diaminodiphenylamine-2-sulphonic acid, and 9.5 parts of sodium carbonate is stirred in a mixture of 100 parts of water and 100 parts of ethyl alcohol. A solution of 1.5 parts of cupric sulphate pentahydrate in 10 parts of water and 15 parts of ammonia solution (s.g. = 0.890) is then added, and a slow stream of air is bubbled through the mixture and the mixture is stirred at 35°–40°C for 24 hours.

The precipitated aminophenazine of probable formula:

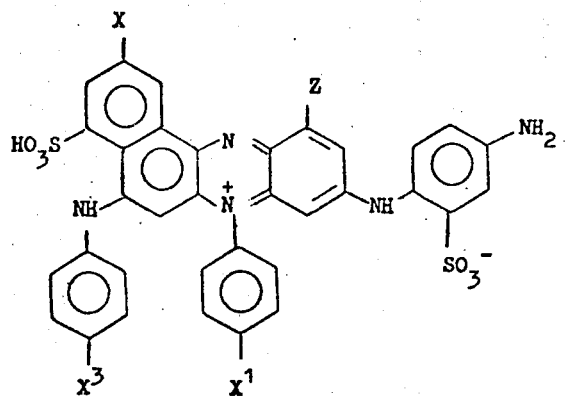

(22)

in which X, $X^1$, $X^3$ and Z all represent H, is filtered off, washed with cold water and dried.

A neutral solution of 1.9 parts of 1-aminobenzene-3-sulphonic acid in 50 parts of water is added to a suspension of 1.9 parts of cyanuric chloride in 100 parts of water at 0°–5°C. The mixture is stirred at 0°–5°C for 1 hour maintaining the pH at 6–7 by addition of 2N sodium carbonate solution. The solution of 2,4-dichloro-s-triazinylaminobenzene-3-sulphonic acid is then added to a suspension of 6.6 parts of the aminophenazine in 500 parts of water, and the mixture is stirred at 35°–40°C for 6 hours maintaining the pH at 6–7 by addition of 2N sodium carbonate solution. The solution is then screened and the filtrates salted 10% weight/volume with sodium chloride. The precipitated dye is separated in a centrifuge at 2000 r.p.m. After decantation of the liquors the dye is dried at 40°C.

When applied to cotton or viscose textile materials the dye gives strong bright blue shades which have good fastness to washing treatments and moderate fastness to light.

Further examples of the invention are found in the Table when one equivalent of the compound in column II, in which the symbols X, $X^1$ and $X^3$ and Z refer to formula (22), is condensed with one equivalent of the acylating agent in column III. In column III, the symbol (dct) represents "-2,4-dichloro-s-triazine". The shade on cotton of all the dyes is bright blue.

These examples fall into a class of dyestuffs which may be represented by formula (22) except that one hydrogen atom of the $NH_2$ group is replaced by the cellulose-reactive group Q of formula (1).

| Example | Compound | Acylating Agent |
|---|---|---|
| 2 | X, $X^1$, $X^3$, Z = H | 6-(3',5'-disulphoanilino)-(dct) |
| 3 | " | 6-(2',5'-disulphoanilino)-(dct) |
| 4 | " | 6-(p-sulphoanilino)-(dct) |
| 5 | " | 6-(2'-methyl-5'-sulphoanilino)-(dct) |
| 6 | " | 6-(2'-carboxy-4'-sulphoanilino)-(dct) |
| 7 | " | 6-(N-ω-sulphomethylanilino)-(dct) |
| 8 | " | 6-(3',6',8'-trisulphonaphth-2'-ylamino)-(dct) |
| 9 | " | 6-(β-sulphoethylamino)-(dct) |
| 10 | " | 6-(4'-sulphophenoxy)-(dct) |
| 11 | " | carbyl sulphate |
| 12 | " | 6-(4',8'-disulphonaphth-2'-ylamino)-(dct) |
| 13 | " | 6-(3',8'-disulphonaphth-1'-ylamino)-(dct) |
| 14 | " | 6-(6'-sulphonaphth-2'-ylamino)-(dct) |
| 15 | " | 6-(4'-β-sulphatoethylsulphonylanilino)-(dct) |
| 16 | " | 6-(3'-β-sulphatoethylsulphonylanilino)-(dct) |
| 17 | " | 6-(5'-sulphonaphth-2'-ylamino)-(dct) |
| 18 | " | 6-(6'-sulphonaphth-1'ylamino)-(dct) |
| 19 | " | 6-(7'-sulphonaphth-1'-ylamino)-(dct) |
| 20 | X = $SO_3H$  $X^1$, $X^3$, Z = H | 2,3-dichloroquinoxaline-5-carbonyl chloride |
| 21 | " | 2,3-dichloroquinoxaline-6-carbonyl chloride |
| 22 | " | 2,3-dichloroquinoxaline-5-sulphonyl chloride |
| 23 | " | 2,3-dichloroquinoxaline-6-sulphonyl chloride |
| 24 | " | 2,4-dichloroquinazoline-7-sulphonyl chloride |
| 25 | " | 2,4-dichloroquinazoline-6-carbonyl chloride |
| 26 | " | 1,4-dichlorophthalazine-6-carbonyl chloride |
| 27 | " | β-(4',5'-dichloropyridaz-3'-on-1'-yl)propionyl chloride |
| 28 | " | 2,4-dichloropyrimid-5-yl carbonyl chloride |
| 29 | " | cyanuric chloride |
| 30 | X = $SO_3H$  $X^1$, $X^3$ = $CH_3$ | 4-(4',5'-dichloropyridaz-6'-on-1'-yl)benzoyl chloride |

| Example | Compound | Acylating Agent |
|---|---|---|
| | Z = H | |
| 31 | " | cyanuric chloride |
| 32 | " | 4-(4',5'-dichloropyridaz-6'-on-1'-yl)phenyl sulphonyl chloride |
| 33 | X = SO₃H X¹ X³ = CH³ Z = OCH₃ | 2,4,6-trifluoro-5-chloropyrimidine |
| 34 | " | 2,4,6-trichloropyrimidine |
| 35 | X = SO₃H X, X³ = OCH³ | 2,4,5,6-tetrachloropyrimidine |
| 36 | X = SO₃H Z = CH₃ | 5-cyano-2,4,6-trichloropyrimidine |
| 37 | " | 5-bromo-2,4,6-trichloropyrimidine |
| 38 | " | 2,4,6-tribromopyrimidine |
| 39 | " | cyanuric chloride |
| 40 | X, X¹ and X³ = H Z = SO₃H | cyanuric chloride |
| 41 | " | 4,5-dichloro-6-methyl-2-methylsulphonyl pyrimidine |
| 42 | " | β-chloroethylsulphonyl-endomethylene-cyclohexane carbonyl chloride |
| 43 | " | 2,2,3,3-tetrafluorocyclobutane carbonyl chloride |
| 44 | " | 2,3,3-trifluoro-cyclobut-1-enecarbonyl chloride |
| 45 | " | β-(2',2',3',3'-tetrafluorocyclobutyl)-acryloyl chloride |
| 46 | " | β-(2',3',3'-trifluorocyclobut-1-enyl)-acryloyl chloride |
| 47 | " | 6-anilino-(dct) |
| 48 | " | 6-(m-sulphoanilino)-(dct) |
| 49 | " | 6-(p-sulphoanilino)-(dct) |
| 50 | " | 6-(4'-sulphonaphth-1'-yl)-(dct) |
| 51 | " | 6-(6'-sulphonaphth-2'-yl)-(dct) |
| 52 | " | 6-(4',8'-disulphonaphth-1'-yl)-(dct) |
| 53 | " | 6-(5',7'-disulphonaphth-2'-yl)-(dct) |
| 54 | X, X¹ and X³ = H Z = SO₃H | 6-amino-(dct) |
| 55 | " | 6-methylamino-(dct) |
| 56 | " | 6-(2'-methyl-4'-sulphoanilino)-(dct) |
| 57 | " | 6-(3'-carboxyanilino)-(dct) |
| 58 | X = SO₃H X¹ X³ Z = H | 6-(3'-sulphoanilino)-(dct) |
| 59 | " | 6-(5'-sulphonaphth-1'-ylamino)-(dct) |
| 60 | " | 6-(7'-sulphonaphth-2'-ylamino)-(dct) |
| 61 | " | 6-(4',8'-disulphonaphth-2'-ylamino)-(dct) |
| 62 | " | 6-β-hydroxyethylamino-(dct) |
| 63 | " | 6-(2'-methyl-4'-sulphoanilino)-(dct) |
| 64 | " | 6-(4'-carboxyanilino)-(dct) |
| 65 | X = SO₃H X¹ X³ = CH₃ Z = H | 6-(6',8'-disulphonaphth-2'-ylamino)-(dct) |

EXAMPLE 66

A mixture of 27.5 parts of 4-amino-4'-nitrodiphenylamine-2'-sulphonic acid and 29.1 parts of N-ethyl-N-3'-sulphobenzylaniline is stirred in 750 parts of water at pH 6–7 and 0°C. A solution of 37.8 parts of sodium dichromate dihydrate in 200 parts of water and 18.6 parts of sulphuric acid, at 0°C is added rapidly and the mixture is stirred for 15 minutes. A solution of 15.5 parts of 4-aminobenzene sulphonic acid in 150 parts of water at 10°C and pH 6–7 is added. The mixture is then stirred at 15°C for 15 minutes, heated to 40°C stirred for a further 15 minutes, then heated rapidly to 80°C and 5.5 parts of sodium carbonate are added. The mixture is then allowed to cool to 70°C during 10 minutes. 25 parts of pin dust are added and the mixture is stirred at 70°–75°C for 75 minutes.

The mixture is filtered at 70°C and the residue extracted with 1500 parts of water at 70°C and refiltered. The combined filtrates are salted 20% weight/volume with sodium chloride and allowed to cool. The precipitated aminophenazine of probable fomula:

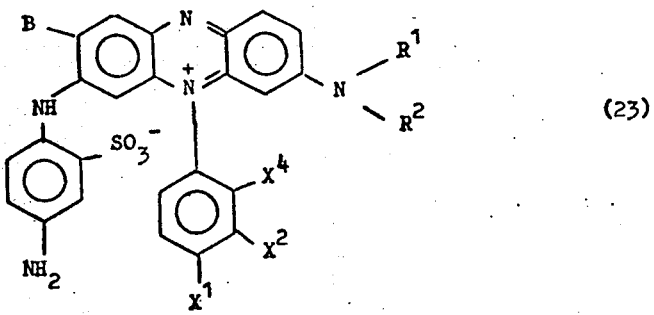

(23)

where
$X^1 = SO_3H$,
$X^2, X^4, B = H$,
$R^1 = C_2H_5$,
$R^2 = $ m-sulphobenzyl,
is filtered off, washed with 20% brine, and dried at 40°C.

A solution of 7.4 parts of the aminophenazine in 200 parts of water at 0°–5°C and pH 6–7 is added to a suspension of 2.0 parts of cyanuric chloride in 150 parts of water at 0°–5°C. The mixture is stirred at 0°–5°C for 1 hour keeping the pH at 6–7 by addition of 2N sodium carbonate solution. The solution is screened and the filtrates salted 10% weight/volume with sodium chloride. The precipitated dye is filtered off, mixed with 0.8 parts of a mixture of 1 part of disodium hydrogen phosphate and 2 parts of potassium dihydrogen phosphate and dried under vacuum.

When applied to cotton or viscose textile materials the dye gives strong bright reddish blue shades with good fastness to washing and moderate fastness to light.

The following Table describes a number of other dyestuffs of the invention obtained by condensing a compound of formula (23) having the meanings of $X^1$, $X^2$, $X^4$, B, $R^1$ and $R^2$ stated in column II, with the compound stated in column III. The term (dct) again stands for "2,4-dichloro-s-triazine".

All the products give reddish-blue shades.

In general, the preferred dyes are those obtained from the amines of formula (23) above, wherein B represents H, $CH_3$ or $OCH_3$, $R^1$ is an alkyl group of up to 4 carbon atoms, $R^2$ is benzyl or a sulphobenzyl group, one of $X^1$, $X^2$ and $X^4$ is sulpho and the others are H; these dyes have one of the hydrogen atoms on the $NH_2$ group replaced by the cellulose-reactive group Q which has any of the meanings stated earlier. Such dyes have high color yield, give very bright reddish-blue shades, very good fastness to washing, and a reasonably high fastness to light, having very much better resistance to wet fading than coppered azo dyes of similar hue.

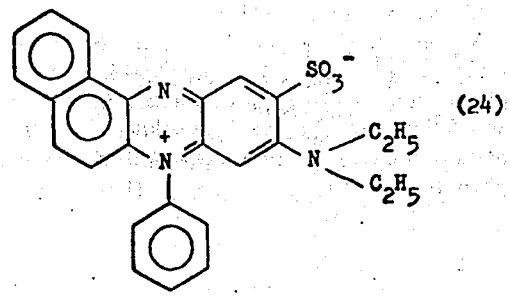

(24)

is filtered off and dried.

A solution of 25 parts of sodium sulphite in 1000 parts of water at pH 7.5 is stirred at 70°–80°C and 25 parts of the phenazine is added during 1½ hours. After the addition is complete the mixture is stirred at 75°–80°C for a further 5 hours. The solution is screened and 100 parts of sodium chloride are added to the cooled filtrates. The disulphonated phenazine of formula:

| Example | II | III |
|---|---|---|
| 67 | All as in 66 | 6-(2',5'-disulphoanilino)-(dct) |
| 68 | $X^1$ = H, $X^2$ = $SO_3H$, others as in 66 | " |
| 69 | $X^1$ = H, $X^4$ = $SO_3H$, others as in 66 | " |
| 70 | " | carbyl sulphate |
| 71 | $X^1$ = H, $X^4$ = $SO_3H$, B = $CH_3$; $X^2$, $R^1$, $R^2$ as in 66 | 4,5-dichloro-6-methyl-2-methylsulphonyl pyrimidine |
| 72 | " | 2,4-dichloropyrimidine-5-carbonyl chloride |
| 73 | " | 6-(3-β-sulphatoethylsulphonylanilino)-(dct) |
| 74 | $X^1$ = H, $X^4$ = $SO_3H$, B = $OCH_3$; $X^2$, $R^1$, $R^2$ as in 66 | 6-(N-ω-sulphomethylanilino)-(dct) |
| 75 | " | acryloyl chloride |
| 76 | " | 2,4,6-trifluoro-5-chloropyrimidine |
| 77 | " | 2,4,6-trichloropyrimidine |
| 78 | $X^1$ = H, $X^4$ = $SO_3H$, B = $OCH_3$; $X^2$, $R^1$, $R^2$ as in 66 | 2,4,5,6-tetrachloropyrimidine |
| 79 | " | cyanuric chloride |
| 80 | " | 3,6-dichloropyridazine-4-carbonyl chloride |
| 81 | $X^1$ = H, $X^4$ = $SO_3H$, B = $OCH_3$, $R^2$ = benzyl; $R^1$, $X^2$ as in 66 | 6-(4-β-sulphatoethylsulphonylanilino)-(dct) |
| 82 | $R^1$, $R^2$ = $CH_3$; others as in 66 | 6-(3',5'-disulphoanilino)-(dct) |
| 83 | $R^2$ = $C_2H_5$; others as in 66 | 6-(2'-carboxy-4'-sulphoanilino)-(dct) |
| 84 | $R^1$, $R^2$ = $CH_2CH_2OH$; others as in 66 | 6-(2'-methyl-5'-sulphoanilino)-(dct) |

EXAMPLE 85

A mixture of 22 parts of phenyl-β-naphthylamine and 24.5 parts of the sodium salt of 3-sulpho-4-diethylaminoaniline in 250 parts of ethyl alcohol and 250 parts of water is stirred and refluxed. 45 Parts of acetic acid are added, followed by a solution of 31 parts of sodium dichromate in 50 parts of water. The mixture is stirred and refluxed for 15 minutes, cooled to 20°C and diluted with 100 parts of water. The precipitated phenazine of formula:

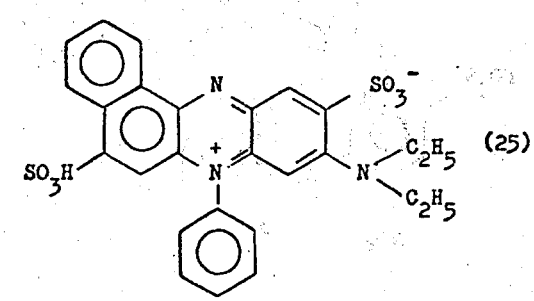

(25)

is filtered off and dried.

A solution of 5.4 parts of the disulphonated phenazine and 4.0 parts of 1,4-phenylenediamine-2,5-disulphonic acid in 100 parts of water at pH 7.0 is stirred and refluxed for 7 hours. The solution is cooled and 5 parts of sodium chloride are added. The precipitated phenazine of formula:

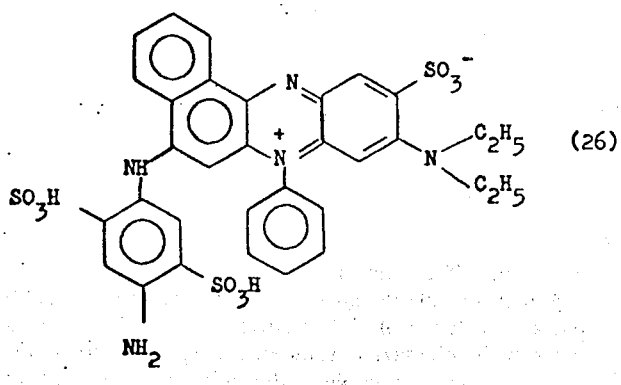

is filtered off and dried.

A solution of 7.3 parts of the aminophenazine prepared above in 400 parts of water at pH 7.0 is added to a suspension of 2.0 parts of cyanuric chloride in 100 parts of water. The mixture was stirred at 0°–5°C for 3 hours keeping the pH at 6–7 by simultaneous addition of 2N sodium carbonate solution as required. The solution is screened and the filtrates salted with 50 parts of sodium chloride. The precipitated dyestuff is filtered off, intimately mixed with 1 part of anhydrous disodium hydrogen phosphate and 1.9 parts of anhydrous potassium dihydrogen phosphate, and dried at a temperature of between 20°C and 30°C.

When applied to cellulose textile materials the dyestuff obtained gives blue shades which are fast to wet treatments. It is representative of a class of dyestuffs of the formula:

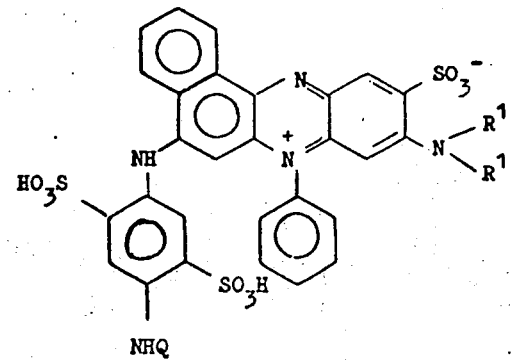

in which $R^1$ is an alkyl group of up to 4 carbon atoms.

EXAMPLE 86

A solution of 9.25 parts of the dichlorotriazine dyestuff prepared in Example 40 in 200 parts of water is stirred at pH 7.0 and 20°C. 1.1 parts of aniline are added and the mixture is stirred at 35°–40°C for 6 hours, maintaining the pH at 6–7 by simultaneous addition of 2N sodium carbonate solution as required. The dyestuff is precipitated by addition of sodium chloride, filtered and dried at 40°C.

When applied to cellulose textile materials it gives bright blue shades with good fastness to washing and moderate fastness to light.

The examples in the following Table are obtained in similar manner to Example 86 by condensing an aminophenazine with cyanuric chloride and the product with ammonia or an amine. The aminophenazine is defined in column II by reference to one of the formulae used in the previous examples; those based on formula (22) and (26) amines are bright blue in shade and those based on formula (23) amines are bright reddish-blue in shade.

| Example | II | III |
|---|---|---|
| 87 | formula (22), X, X$^1$, X$^3$, Z = H | m-aminobenzene sulphonic acid |
| 88 | " | 3,5-disulphoaniline |
| 89 | " | 2,5-disulphoaniline |
| 90 | " | sulphanilic acid |
| 91 | " | 2-methyl-5-sulphoaniline |
| 92 | " | 2-amino-5-sulphobenzoic acid |
| 93 | " | N-ω-sulphomethylaniline |
| 94 | " | 2-naphthylamine-3,6,8-trisulphonic acid |
| 95 | " | β-sulphoethylamine |
| 96 | " | 2-naphthylamine-4,8-disulphonic acid |
| 97 | " | 1-naphthylamine-3,8-disulphonic acid |
| 98 | " | 2-naphthylamine-6-sulphonic acid |
| 99 | " | 4-β-sulphatoethylsulphonyl aniline |
| 100 | " | 3-β-sulphatoethylsulphonyl aniline |
| 101 | " | 2-naphthylamine-5-sulphonic acid |
| 102 | " | 1-naphthylamine-6-sulphonic acid |
| 103 | " | 1-naphthylamine-7-sulphonic acid |
| 104 | formula (22), X, X$^1$, X$^3$ = H; Z = SO$_3$H | m-sul-lph-hoan-nili-ne |
| 105 | " | p-sulphoaniline |
| 106 | " | 1-naphthylamine-4-sulphonic acid |
| 107 | " | 1-naphthylamine-4,8-disulphonic acid |
| 108 | " | 2-naphthylamine-5,7-disulphonic acid |
| 109 | " | ammonia |
| 110 | " | methylamine |
| 111 | " | 2-methyl-4-sulphoaniline |
| 112 | " | m-aminobenzoic acid |
| 113 | formula (22), X = SO$_3$H; X$^1$, X$^3$, Z = H | m-sulphoaniline |
| 114 | " | 1-naphthylamine-5-sulphonic acid |
| 115 | " | 2-naphthylamine-7-sulphonic acid |
| 116 | " | β-hydroxyethylamine |
| 117 | " | p-aminobenzoic acid |
| 118 | formula (22), X = SO$_3$H, X$^1$, X$^3$ = CH$_3$, Z = H | 2-naphthylamine-6,8-disulphonic acid |
| 119 | formula (23), X$^1$ = SO$_3$H; X$^2$, X$^4$, B = H; R$^1$ = C$_2$H$_5$; R$^2$ m-sulphobenzyl | 2-amino-5-sulphobenzoic acid |
| 120 | " | aniline-2,5-disulphonic acid |
| 121 | formula (23) X$^1$ = H, X$^2$ = SO$_3$H, X$^4$, B, R$^1$, R$^2$ as in 119 | " |
| 122 | formula (23), X$^1$ = H, X$^4$ = SO$_3$H, X$^2$, B, R$^1$, R$^2$ as in 119 | " |
| 123 | formula (23), X$^1$ = H, X$^4$ = SO$_3$H, B = CH$_3$; X$^2$, R$^1$, R$^2$ as in 119 | 3-β-sulphatoethylsulphonyl aniline |
| 124 | formula (23), X$^1$ = H, X$^4$ = SO$_3$H, B = OCH$_3$; X$^2$, R$^1$, R$^2$ as in 119 | N-ω-sulphomethyl aniline |
| 125 | formula (23), X$^1$ = H, X$^4$ = SO$_3$H, B = OCH$_3$, R$^2$ = benzyl, R$^1$ = C$_2$H$_5$, X$^2$ = H. | 4-β-sulphatoethylsulphonyl aniline |
| 126 | formula (23), R$^1$, R$^2$ = CH$_3$; X$^1$, X$^2$, X$^4$, B as in 119 | aniline-3,5-disulphonic acid |
| 127 | formula (23), R$^2$ = C$_2$H$_5$; R$^1$, X$^1$, X$^2$, X$^4$, B as in 119 | 2-amino-5-sulphobenzoic acid |
| 128 | formula (23), R$^1$, R$^2$, = CH$_2$CH$_2$OH; X$^1$, X$^2$, X$^4$, B as in 119 | 2-methyl-5-sulphoaniline |
| 129 | formula (26) | m-sulphoaniline |
| 130 | " | sulphanilic acid |
| 131 | " | 2-aminotoluene-4-sulphonic acid |
| 132 | " | 2-amino-5-sulphobenzoic acid |
| 133 | " | ammonia |

Example 134

A solution of 9.25 parts of the dyestuff obtained in Example 29 is stirred in 200 parts of water at 20°C and pH 7.0. A solution of 2.0 parts of 4,4'-diaminodiphenylurea-2,2'-disulphonic acid in 50 parts of water at pH 7.0 is added and the mixture is stirred at 35°–40°C for 8 hours maintaining the pH at 6–7 by simultaneous addition of 2N sodium carbonate solution as required. The dyestuff is precipitated by addition of potassium chloride, filtered and dried at 40°C.

When applied to cotton textile materials it gives reddish-blue shades with good fastness to washing and moderate fastness to light.

A similar dyestuff is obtained if, in place of the 2.0 parts of 4,4'-diaminodiphenylamine-2,2'-disulphonic acid used in the example above, there is used an equivalent amount of any of the following diamines:

| | |
|---|---|
| 4,4'-diaminostilbene-2,2'-disulphonic acid | Example 135 |
| 5,5'-diaminodiphenylurea-2,2'-disulphonic acid | Example 136 |
| 4,4'-diaminodiphenoxyethane-2,2'-disulphonic acid | Example 137 |
| benzidine-2,2'-disulphonic acid | Example 138 |

Example 139

A solution of 8.8 parts of the dye prepared in Example 66 is stirred in 200 parts of water at pH 6–7 and 20°C. A solution of 1.7 parts of 1,3-phenylenediamine-4-sulphonic acid in 50 parts of water at pH 7.0 is added and the mixture is stirred at 35°–40°C for 6 hours maintaining the pH at 6–7 with simultaneous addition of 2N sodium carbonate solution as required. The solution is then cooled to 0°–5°C and a solution of 1.9 parts of cyanuric chloride in 25 parts of acetone added. The mixture is then stirred at 0°–5°C for 5 hours maintaining the pH at 6–7 by addition of 2N sodium carbonate solution as required. A solution of 1.8 parts of 1-aminobenzene-3-sulphonic acid in 50 parts of water at pH 7.0 is then added and the mixture stirred at 35°–40°C for a further 5 hours keeping the pH at 6–7 by addition of 2N sodium carbonate solution as required.

The dyestuff is precipitated by addition of sodium chloride, filtered and dried. On analysis it is found to contain 2.0 atoms of hydrolyzable chlorine per molecule of dye.

When applied to cellulose textile materials in the presence of an acid binding agent it gives bright reddish blue shades which are fast to washing.

Further examples of the invention are found in the Table when the dyestuff prepared in the Example indicated in column II is first condensed with the diamine in column III, then reacted with the compound in column IV, and finally with the compound in column V (where indicated). The shade is given in column VI.

| Example | II | III Diamine | IV Acylating Agent | V | VI Shade |
|---|---|---|---|---|---|
| 140 | 66 | 1,3-phenylenediamine-4-sulphonicacid | 2,4-dichloro-6-methoxy-s-triazine | | Reddish-blue |
| 141 | " | " | cyanuric chloride | ammonia (6 mols) | " |
| 142 | 29 | 1,4-phenylenediamine-2-sulphonic acid | " | " | Blue |
| 143 | " | " | 2,4-dichloro-6-methoxy-s-triazine | | " |
| 144 | 39 | " | cyanuric chloride | 2-aminotoluene-4-sulphonic acid | " |
| 145 | " | " | " | sulphanilic acid | " |

Example 146

To a solution of the dyestuff obtained as described in Example 119 there are added 3 parts of pyridine and 2 parts of sodium sulphite. The solution is stirred at 60°C until sulphiting is complete as judged by estimation of liberated sodium chloride. The solution is evaporated to dryness at 40°C under vacuum.

When applied to cellulose textiles it gives bright reddish-blue shades which have good fastness to washing and moderate fastness to light.

Example 147

To a solution of the dyestuff obtained as described in Example 119 there are added 3 parts of trimethylamine in 10 parts of water. The mixture is stirred at 20°C for 30 minutes. The dyestuff is precipitated by addition of salt, filtered and dried. When applied to cellulose textiles it gives bright reddish-blue shades with good fastness to washing and moderate fastness to light.

Example 148

A solution of 15.5 parts of 4-amino-4'-nitrodiphenylamine-2'-sulphonic acid and 13.9 parts of N-methyl-N-3'-sulphobenzylaniline in 250 parts of water is stirred at pH 6–7 and 10°C. A solution of 10.2 parts of sodium dichromate dihydrate in 60 parts of water and 13 parts of sulphuric acid is added rapidly and the mixture is stirred rapidly at 10°–20°C for 20 minutes. A solution of 10.4 parts of 4-chloraniline-3-sulphonic acid in 50 parts of water at pH 7.0 at 15°C is added, followed quickly by a solution of 9.9 parts of sodium dichromate dihydrate in 20 parts of water. The mixture is heated to 90°–95°C for 20 minutes, cooled to 65°C and the pH is adjusted to 5.5 by addition of acetic acid. 15 parts of pin dust are added and the mixture is stirred at 65°–70°C for 90 minutes.

The mixture is filtered at 70°C and the filtrate is made just alkaline to Brilliant Yellow by addition of sodium carbonate and refiltered. The filtrate is salted 20% weight/volume with sodium chloride and allowed to cool. The precipitated aminophenazine of probable formula:

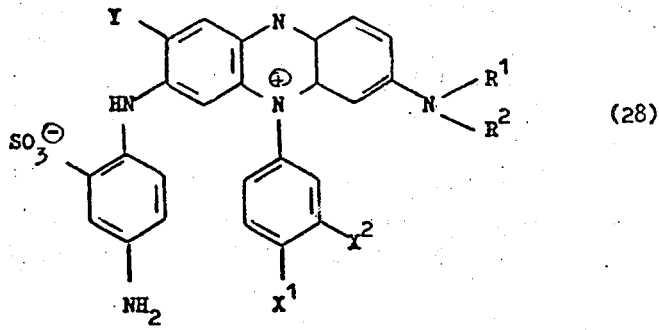

(28)

where $X^2 = SO_3H$, $X^1 = Cl$, $R^1 = CH_3$, $R^2 =$ m-sulphobenzyl, $Y = H$, is filtered off, washed with 25% brine and dried at 40°C.

A solution of 8.95 parts of the aminophenazine in 300 parts of water at pH 6.5 is stirred at 0°–5°C, and a solution of 2.3 parts of cyanuric chloride in 30 parts of acetone is added during 5 minutes. The mixture is stirred at 0°–5°C for 30 minutes keeping the ph at 6–7 by addition of 2N sodium carbonate solution. The solution is filtered and the filtrate is salted 15% weight-/volume with sodium chloride. The precipitated dye is filtered off, mixed with 1.5 parts of a mixture of 1 part of disodium hydrogen phosphate and 2 parts of potassium dihydrogen phosphate and dried under vacuum.

When applied to cotton or viscose textile materials the dye gives strong bright reddish-blue shades with good fastness to washing and moderate fastness to light.

The following Table describes a number of other dyestuffs of the invention obtained by condensing a compound of formula (28) having the meanings of $X^1$, $X^2$, $Y$, $R^1$ and $R^2$ stated in columns II, III, IV, V and VI respectively, with the compound stated in column VII. The term (dct) stands for "2,4-dichloro-s-triazine".

All the products give reddish blue shades.

| Example | II | III | IV | V | VI | VII |
|---|---|---|---|---|---|---|
| 149 | Cl | SO₃H | H | CH₃ | m-sulphobenzyl | carbyl sulphate |
| 150 | " | " | " | " | " | 2,4,6-trifluoro-5-chloropyrimidine |
| 151 | " | " | " | " | " | 2,4-dichloropyrimidine-5-carbonyl chloride |
| 152 | " | " | " | C₂H₅ | " | cyanuric chloride |
| 153 | " | " | " | " | " | 6-(2',5'-disulphoanilino)-(dct) |
| 154 | " | " | " | " | " | 6-(2'-methyl-4'-sulphoanilino)-(dct) |
| 155 | " | " | " | " | " | 6-(2'-methyl-5'-sulphoanilino)-(dct) |
| 156 | " | " | " | " | " | 6-(3'-sulphoanilino)-(dct) |
| 157 | " | " | " | " | " | 6-(4'-sulphoanilino)-(dct) |
| 158 | " | " | " | " | " | 4,5-dichloro-6-methyl-2-methylsulphonyl pyrimidine |
| 159 | " | " | " | " | " | 6-(N-ω-sulphomethylanilino)-(dct) |
| 160 | CH₃ | " | " | " | " | 6-(3'-β-sulphatoethylsulphonylanilino)-(dct) |
| 161 | " | " | " | " | " | cyanuric chloride |
| 162 | " | " | " | " | " | 6-(2'-methyl-5'-sulphoanilino)-(dct) |
| 163 | OCH₃ | SO₃H | CH₃ | —CH₂CH₂CH₃ | m-sulphobenzyl | 2,2,3,3-tetrafluorocyclobutyl carbonyl chloride |
| 164 | " | " | " | " | " | β-(2,2,3,3-tetrafluorocyclobutyl)acryloyl chloride |
| 165 | " | " | " | —CH₃ | " | 2,3,3-trifluorocyclobut-1-enyl carbonyl chloride |
| 166 | " | " | " | " | " | β-(2,3,3-trifluorocyclobut-1-enyl)acryloyl chloride |
| 167 | SO₃H | CH₃ | OCH₃ | " | " | 6-(4-sulphophenoxy)(dct) |
| 168 | " | OCH₃ | H | " | " | 6-(2'-carboxy-5-sulphoanilino)(dct) |
| 169 | " | " | " | " | CH₃ | 6-(2',5'-disulphoanilino)(dct) |
| 170 | " | " | " | —CH₂CH₂OH | —CH₂CH₂OH | " |
| 171 | " | CH₃ | " | —CH₂CH₂CN | —CH₂CH₂CN | 6-(3',5'-disulphoanilino)(dct) |
| 172 | " | " | " | —C₂H₅ | benzyl | " |
| 173 | Cl | SO₃H | " | " | —C₂H₅ | 6-(2'-carboxy-4'-sulphoanilino)(dct) |
| 174 | " | " | " | CH₃ | benzyl | " |
| 175 | " | " | " | benzyl | " | " |
| 176 | OCH₃ | SO₃H | H | Ethyl | 3-sulphobenzyl | cyanuric chloride |
| 177 | " | " | " | " | " | 3,6-dichloropyridazine-4-carbonyl-chloride |
| 178 | " | " | " | " | " | carbyl sulphate |
| 179 | " | " | " | " | " | 2,3 dichloroquinoxaline-6-carbonyl chloride |
| 180 | " | " | " | " | " | 4,5-dichloro-6-methyl-2-methyl-sulphonyl-pyrimidine |
| 181 | " | " | " | " | " | 2,4-dichloropyrimidine-5-carbonyl chloride |
| 182 | " | " | " | " | " | 2,4,6-trifluoro-5-chloropyrimidine |
| 183 | " | " | " | " | " | 2,3-dichloroquinoxaline-5-carbonyl chloride |
| 184 | " | " | " | " | " | 2,4,6-trichloropyrimidine |
| 185 | " | " | " | " | " | 2,4,5,6-tetrachloropyrimidine |
| 186 | " | " | " | " | " | 5-cyano-2,4,6-trichloropyrimidine |
| 187 | " | " | " | " | " | 2,4-dichloro-6-methoxy-s-triazine |
| 188 | OCH₃ | SO₃H | H | Ethyl | 3-sulphobenzyl | 2,4-dichloro-6-phenoxy-s-triazine |
| 189 | " | " | " | " | " | 2,4-dichloro-6-isopropoxy-s-triazine |
| 190 | " | " | " | " | " | 2,4-dichloro-6-ethoxy-s-triazine |
| 191 | " | " | " | " | " | 6(2'-methyl-4'-sulpho-anilino)-(dct) |
| 192 | " | " | " | " | " | 6(2'-methyl-5'-sulpho-anilino)-(dct) |
| 193 | " | " | " | " | " | 6(2'-carboxy-4'-sulpho-anilino)-(dct) |
| 194 | " | " | " | " | " | 6(4'-carboxyanilino)-(dct) |
| 195 | " | " | " | " | " | 6(4'-sulphoanilino)-(dct) |
| 196 | " | " | " | " | " | 6(3'-sulphoanilino)-(dct) |
| 197 | " | " | " | " | " | 6(4'-sulphoplenoxy)-(dct) |
| 198 | " | " | " | " | " | 6(2',5'-disulphoanilino)-(dct) |
| 199 | " | " | " | " | " | 6(3',5'-disulphoanilino)-(dct) |
| 200 | " | " | " | " | " | 6(N-W-sulphomethylanilino)(dct) |
| 201 | OCH₃ | SO₃H | H | Ethyl | 3-sulphobenzyl | 6-methylamino-(dct) |
| 202 | " | " | " | " | " | 6-(B-sulphoethylamino)-(dct) |
| 203 | " | " | " | " | " | 6-(4',8'-disulphonaphth-2'-ylamino)-(dct) |
| 204 | " | " | " | " | " | 6 [2',5-disulpho-4'-(2''-chloro-4''-amino-s-triazinylamino)anilino] (dct) |
| 205 | " | " | " | " | " | cyanuric bromide |
| 206 | " | " | " | " | " | β-(4',5'-dichloropyridaz-3'-on 1'-yl)propionyl chloride |
| 207 | " | " | " | " | " | 4-(4',5-dichloropyridaz-6'-on-1'-yl) benzoyl chloride |
| 208 | " | " | " | " | " | 5-bromo-2,4,6-dichloropyrimidine |
| 209 | " | " | " | " | " | 2,4,6-tribromopyrimidine |
| 210 | " | " | " | " | " | 2,2,3,3-tetrafluoro-cyclobutane carbonyl chloride |
| 211 | " | " | " | " | " | 2,3,3-trifluoro-cyclobut-1-enecarbonyl chloride |
| 212 | " | " | " | " | " | B(2',2',3',3'-tetrafluorocyclobutyl)acryloyl chloride |
| 213 | OCH₃ | SO₃H | H | Ethyl | 3-sulphobenzyl | B(2',3',3'-trifluorocyclobut-1-enyl)acryloyl chloride |
| 214 | " | " | " | " | " | 2-chloro-4-[2',5'-disulphoanilino]-6-[4''-amino(dct)-3''-sulphophenylamino]-s-triazine |
| 215 | " | " | " | " | " | B-chloroethylsulphenyl-endomethylene-cyclohexane carbonyl chloride |

Examples 216–222

A solution of 9.03 parts of the dichlorotriazinyl dyestuff prepared in Example 5 in 200 parts of water is stirred at pH 7.0 and 20°C. 1.1 parts of aniline are added and the mixture is stirred at 35°–40°C for 6 hours, maintaining the pH at 6–7 by simultaneous addition of 2N sodium carbonate solution. The dyestuff is precipitated by addition of sodium chloride, filtered and dried at 40°C.

When applied to cellulose textile materials it gives bright blue shades with good fastness to washing and moderate fastness to light.

In place of the aniline used in this Example above there may be used an equivalent amount of:

| Example | Amine |
|---|---|
| 217 | o-toluidine |
| 218 | m-toluidine |
| 219 | p-toluidine |
| 220 | o-anisidine |
| 221 | aniline-3,5-disulphonic acid |
| 222 | ammonia (6 moles) | when dyes similar in shade and fastness properties to those described above are obtained.

Example 223–231

A solution of 15.5 parts of 4-aminodiphenylamine-2'-sulphonic acid and 13.9 parts of N-methyl-N-3'-sulphobenzylaniline in 250 parts of water is stirred at pH 6–7 and 10°C. A solution of 10.2 parts of sodium dichromate dihydrate in 60 parts of water and 13 parts of sulphuric acid is added rapidly and the mixture stirred rapidly at 10°–20°C for 20 minutes. A solution of 10.0 parts of 4'-B-hydroxyethylsulphonyl aniline in 50 parts of water at pH 7.0 is added, followed quickly by a solution of 9.9 parts of sodium dichromate dihydrate in 20 parts of water. The mixture is heated to 90°–95°C for 20 minutes and filtered hot. The residue is washed with 400 parts of water at 90°–95°C. The combined filtrate and washings are cooled to 20°C and salted 10% weight/volume with sodium sulphate. The precipitated dyestuff is filtered off and dried.

The dry dyestuff is then stirred in 40 parts of sulphuric acid for 4 hours at 25°–30°C. The cooled solution is then poured onto 100 parts of ethyl alcohol. The precipitated dyestuff is filtered off and washed with ethyl alcohol until the washings are free from sulphuric acid. The dyestuff is then dried at 40°C.

When applied to cotton or viscose textile materials the dye gives strong bright reddish-blue shades with good fastness to washing and moderate fastness to light.

Similar dyestuffs may be obtained by using in place of the 4-B-hydroxyethylsulphonyl aniline used in the above example an equivalent amount of the following:

| Example | |
|---|---|
| 224 | 3-B-hydroethylsulphonyl aniline |
| 225 | 2-methoxy-4-B-hydroxyethylsulphonyl aniline |
| 226 | 2-methyl-4-B-hydroxyethylsulphonyl aniline |
| 227 | 4-methyl-3-B-hydroxyethylsulphonyl aniline |

Also similar dyestuffs may be obtained by using, in Example 223, in place of the 4-aminodiphenylamine-2-sulphonic acid an an equivalent amount of the following compounds:

| Example | |
|---|---|
| 228 | 4-amino-2-methyldiphenylamino-2'-sulphonic acid. |
| 229 | 4-amino-2-methoxydiphenylamine-2'-sulphonic acid. |

Further similar dyestuff may also be obtained by using in Example 223, in place of the N-methyl-N-3'-sulphobenzylaniline an equivalent amount of the following amines.

| Example | |
|---|---|
| 230 | N-ethyl-N-3'-sulphobenzyl aniline |
| 231 | N-ethyl-N-3'-sulphobenzyl-m-toluidine. |

Example 232

A solution of 9.13 parts of the dichlorotriazinyl dyestuff prepared in Example 176 in 200 parts of water is stirred at pH 7.0 and 20°C. 1.1 parts of aniline are added and the mixture is stirred at 35°–40°C for 6 hours, maintaining the pH at 6–7 by simultaneous addition of 2N sodium carbonate solution as required. The dyestuff is precipitated by addition of sodium chloride, filtered, and dried at 40°C.

When applied to cellulose textile materials it gives bright reddish blue shades with good fastness to washing and moderate fastness to light.

In place of the aniline used in the above Example there may be used an equivalent amount of:

| Example | Amine |
|---|---|
| 233 | o-toluidine |
| 234 | m-toluidine |
| 235 | p-toluidine |
| 236 | o-anisidine |
| 237 | m-chloroaniline |
| 238 | ammonia (6 mols) |
| 239 | methylamine (6 mols) |
| 240 | dimethylamine (6 mols) |

When dyes similar in shade and fastness to those described above are obtained.

I claim:

1. A reactive dyestuff of the formula:

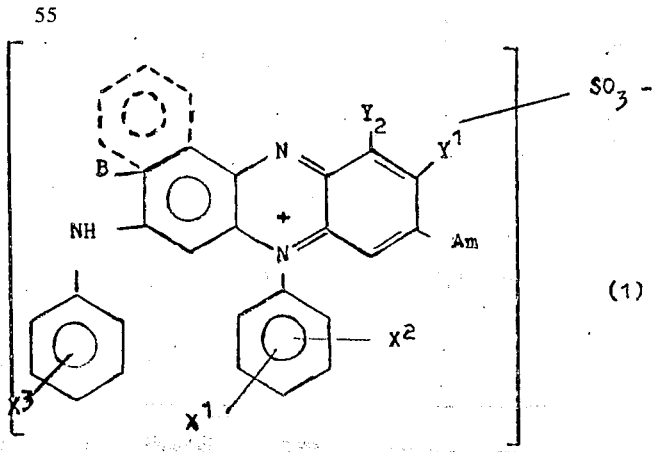

(1)

wherein Am is selected from the group consisting of anilino, di(lower alkyl)amino wherein each alkyl moiety has 1–4 carbon atoms, di(hydroxyethyl) amino, di(cyanoethyl) amino and N(alkyl) benzylamino wherein the alkyl moiety has 1–4 carbon atoms, one of $Y^1$ and $Y^2$ is H or $SO_3H$ and the other is H or an alkyl or alkoxy group of 1–4 carbon atoms, one of $X^1$ or $X^2$ is H or $SO_3H$ and the other is H, an alkyl or alkoxy group of 1–4 carbon atoms, Cl or $CO_2H$, $X^3$ is H, an alkyl group of 1–4 carbon atoms or $SO_3H$, when the dotted fused ring is present B is absent and when the dotted fused ring is absent B is H or an alkyl or alkoxy group of 1–4 carbon atoms, one or both of the phenylene ring substituted by $X^3$ and the Am group when it is anilino contains a NHQ group wherein Q is a cellulose reactive group of the triazine series having the formula:

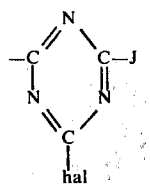

wherein hal is chlorine or bromine, and

J is chlorine, bromine, amino, $NHR^5$, $NR^5R^6$ or $R^5$ wherein $R^5$ and $R^6$ are selected from alkyl having 1–4 carbon atoms; hydroxyalkyl having 1–4 carbon atoms; sulphoalkyl having 1–4 carbon atoms; N-w-sulphomethylanilino, anilino or phenoxy, each having 0–2 substituents selected from $SO_3H$, $CH_3$, COOH, $SO_2CH_2CH_2OSO_3H$, $OCH_3$ and Cl; naphthylamino substituted by 1–3 $SO_3H$ groups; and

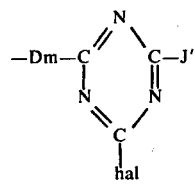

wherein hal is chlorine or bromine, and

J' is J which has the meaning given above or aminophenazine group defined above by formula (1) with an NH group in place of NHQ and Dm is the N,N'-di-radical of a diamine selected from the group consisting of the mono and disulphonic acids of phenylene diamine, N-methyl phenylene diamine, N-ethyl phenylene diamine, naphthylamine, diaminodiphenyl, diaminodiphenylurea, diaminodiphenylamine, diaminodiphenoxyethane, diaminodiphenylmethane and and the dyestuff as a whole contains at least 2 $SO_3H$ groups.

2. The reactive dyestuff of claim 1 wherein hal is chlorine.

3. The reactive dyestuff of claim 1 having the formula:

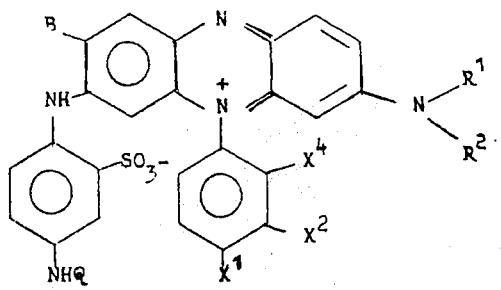

wherein B is H, alkyl containing 1–4 carbon atoms or alkoxy containing 1–4 carbon atoms, $R^1$ and $R^2$ are selected from the group consisting of alkyl, benzyl and sulphobenzyl, one of $X^1$ and $X^2$ is H or $SO_3H$ and the other is H, alkyl containing 1–4 carbon atoms, alkoxy containing 1–4 carbon atoms, Cl or $CO_2H$, $X^4$ is H or $SO_3H$ and Q has the meaning given in claim 8.

4. The reactive dyestuff of claim 3 having the formula:

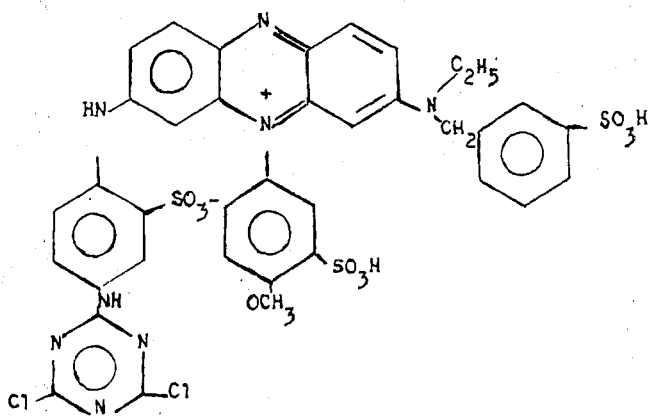

5. The reactive dyestuff of claim 3 having the formula:
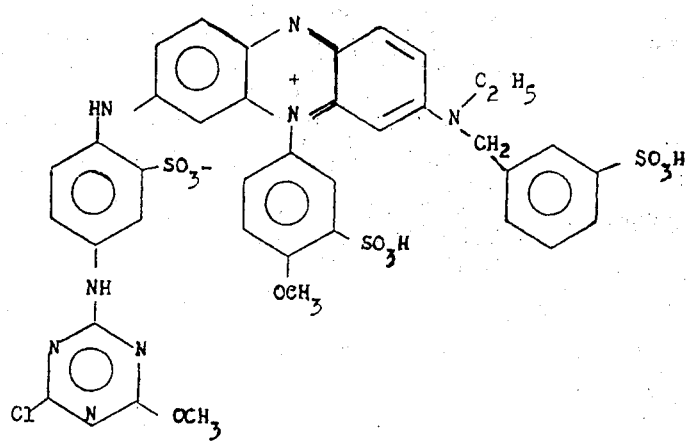
6. The reactive dyestuff of claim 1 having the formula:
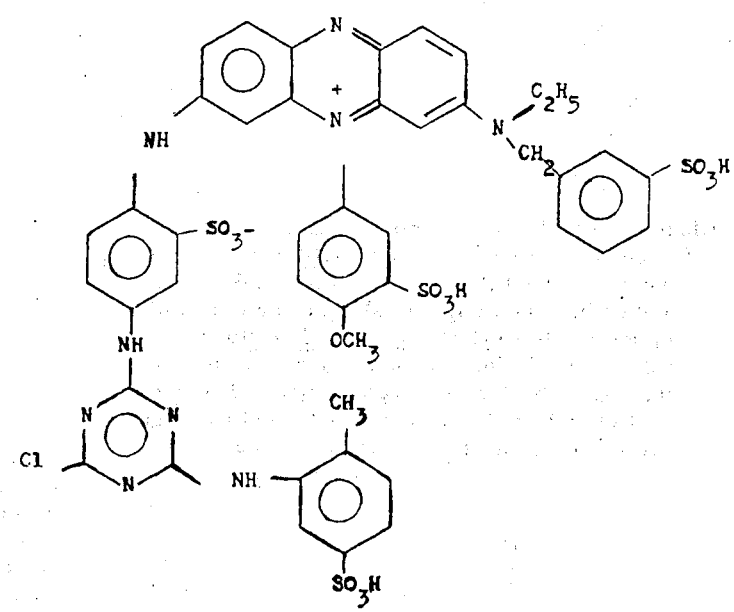
* * * * *

UNITED STATES PATENT OFFICE
CERTIFICATE OF CORRECTION

Patent No. 3,951,974    Dated April 20, 1976

Inventor(s) Allen Crabtree

It is certified that error appears in the above-identified patent and that said Letters Patent are hereby corrected as shown below:

In the heading: [30] Foreign Application Priority Data, please add --February 11, 1972 United Kingdom 6499/72--.

Column 1, line 11, delete "5".

Column 2, line 39-40 should read --β-(4:5-dichloropyridazanyl-1-)-propionyl--.

line 45, change "-pyrid-4-yl" to --pyrimidin-4-yl--.

line 46, delete "photographic".

Column 4, line 14, "-$SO_2$ CH=$CH_2$" should read -- -$SO_2CH=CH_2$--.

line 36, should read "β-unsaturated".

line 40, should read "β-bromo- and β-chloro-".

line 41, should read "β-dichloro-".

line 43, should read "β-(2,2,3,3-tetrafluorocyclobutyl)".

line 45, should read "β-(2,3,3-trifluorocyclobut-1-enyl)".

line 63, delete "5'".

Column 7, line 3, should read "4,4'-diaminodiphenylamines".

line 15, should read "where".

line 22, should read "dianilinonaphthalene-".

line 24, should read "naphthalene-8-sulphonic".

Column 8, line 34, should read "methoxyphenyl-".

line 35, should read "3'-sulphophenyl-".

line 63, should read "(β-hydroxyethyl)".

Column 9, line 52, after "sulphonated" delete the comma.

Column 10, delete line 42.

Columns 25-26, Example 202, under VII, should read "6-(β-sulphoethyl-amino)-(dct)".

UNITED STATES PATENT OFFICE
CERTIFICATE OF CORRECTION

Patent No. 3,951,974      Dated April 20, 1976

Inventor(s) Allen Crabtree

It is certified that error appears in the above-identified patent and that said Letters Patent are hereby corrected as shown below:

Example 212, under VII, should read "β-(2',2',3',3'-tetrafluorocyclobutyl)acryloyl chloride".

Example 213, under VII, should read "β-(2',3',3'-trifluorocyclobut-1-enyl)acryloyl chloride".

Example 215, under VII, should read "β-chloroethyl-sulphenyl-endomethylene-cyclohexane carbonyl halide".

Column 27, line 36, should read "4'-β-hydroxyethylsulphonyl aniline".

Column 28, line 1, should read "4-β-hydroxyethylsulphonyl".

Between lines 4-7:

Example 224 should read "3-β-".

Example 225 should read "-4-β-".

Example 226 should read "-4-β".

Example 227 should read "-3-β-".

Between lines 12-15:

Example 228 should read "methyldiphenylamine-".

Column 29, line 29 "$R^5$" should read "$OR^5$".

line 32, should read "and sulphoalkyl".

Column 30, line 46, "8" should read --1--.

Column 32, line 1, "1" should read --3--.

Signed and Sealed this

Fourteenth Day of September 1976

[SEAL]

Attest:

RUTH C. MASON      C. MARSHALL DANN
Attesting Officer      Commissioner of Patents and Trademarks